March 17, 1959 H. H. RUGG 2,878,300

BUS STRUCTURE

Filed Feb. 26, 1954 4 Sheets-Sheet 1

WITNESSES

Wm. L. Groome

INVENTOR

Harold H. Rugg.

BY [signature]

ATTORNEY

WITNESSES:
*Wm. La Groone*

INVENTOR
Harold H. Rugg.
BY *[signature]*
ATTORNEY

March 17, 1959 H. H. RUGG 2,878,300

BUS STRUCTURE

Filed Feb. 26, 1954 4 Sheets-Sheet 3

WITNESSES:

*[signature]*

INVENTOR

Harold H. Rugg.

BY *[signature]*

ATTORNEY

March 17, 1959 H. H. RUGG 2,878,300

BUS STRUCTURE

Filed Feb. 26, 1954 4 Sheets-Sheet 4

WITNESSES:
Wm. C. Groome

INVENTOR
Harold H. Rugg.
BY [signature]
ATTORNEY

United States Patent Office 2,878,300
Patented Mar. 17, 1959

2,878,300

BUS STRUCTURE

Harold H. Rugg, Pittsburgh, Pa., assignor to Westinghouse Electric Corporation, East Pittsburgh, Pa., a corporation of Pennsylvania Application February 26, 1954, Serial No. 412,787

5 Claims. (Cl. 174—15)

My invention relates, generally, to bus structures and, more particularly, to ventilating systems for bus structures of the isolated or segregated phase type.

An important object of my invention is to make possible buses having a higher current rating than have been supplied heretofore, particularly where space limitations may not permit increasing the size of the bus structure to obtain higher ratings with natural ventilation.

An object of my invention, generally stated, is to provide an isolated phase bus structure which shall be simple and efficient in operation and which may be economically manufactured and installed.

A more specific object of my invention is to provide a system of forced ventilation for an isolated or segregated phase bus structure.

Another object of my invention is to provide a closed system of ventilation for an isolated or segregated phase bus structure.

A further object of my invention is to provide a combined supporting and ventilating system for the bus bars of an isolated phase bus structure.

Still another object of my invention is to provide a ventilating system which will maintain a substantially uniform temperature throughout the entire length of an enclosed bus bar.

Other objects of my invention will be explained fully hereinafter or will be apparent to those skilled in the art.

In accordance with one embodiment of my invention, air or other fluid is forced through the inside of a hollow bus bar in one direction a predetermined distance and returned through the metal housing which encloses the bus bar, thereby circulating the air along both the inside and the outside of the bus bar which increases the cooling effect for a given volume of air, and maintains a substantially uniform temperature throughout the entire length of bus bar. The air may be recirculated after passing through a heat exchanger to lower its temperature.

For a better understanding of the nature and objects of the invention, reference may be had to the following detailed description, taken in conjunction with the accompanying drawings, in which.

Figure 1:
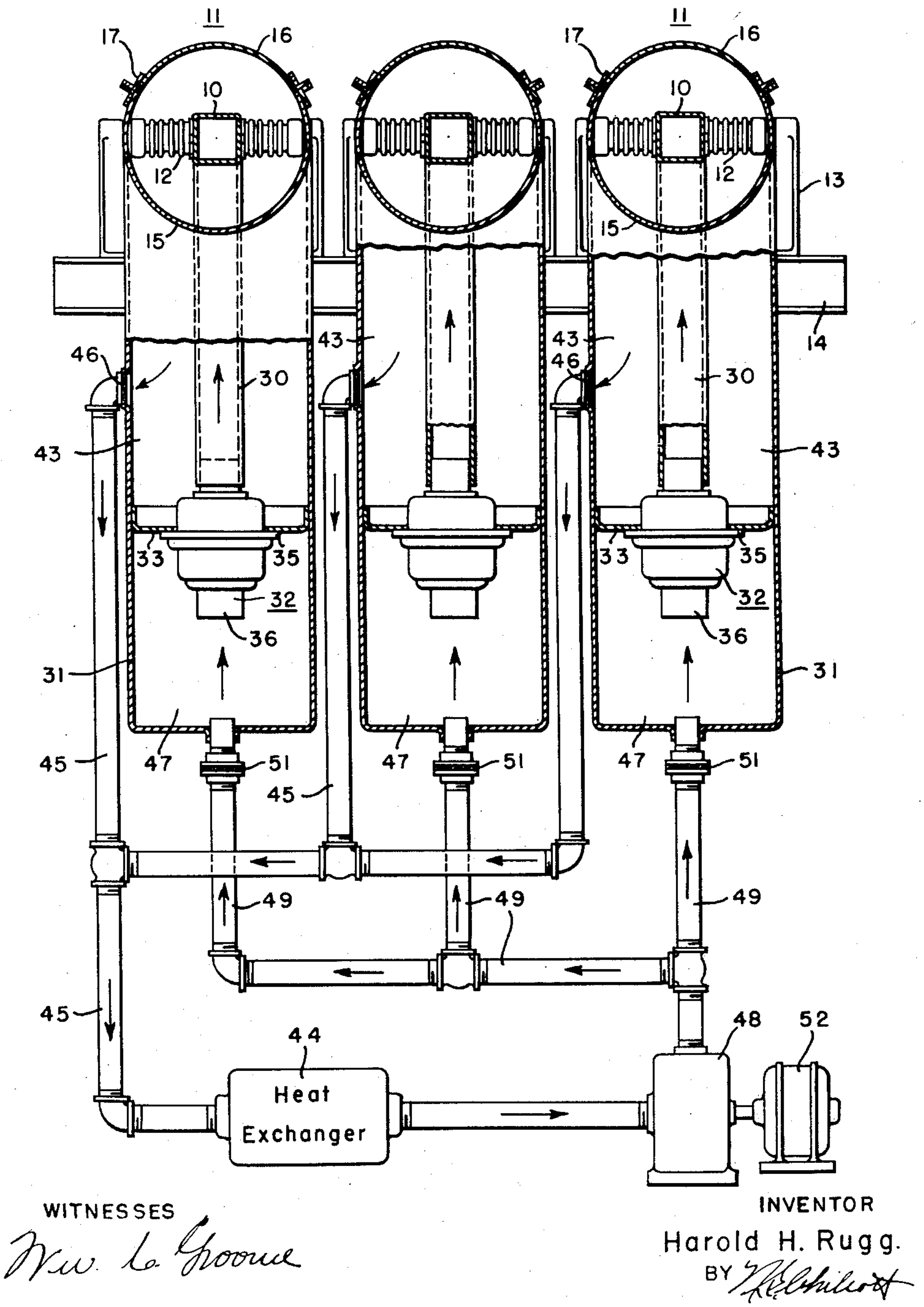
Figure 1 is a view, partly in end elevation and partly in section, of a three-phase bus structure embodying the principal features of the invention.
Figure 2:
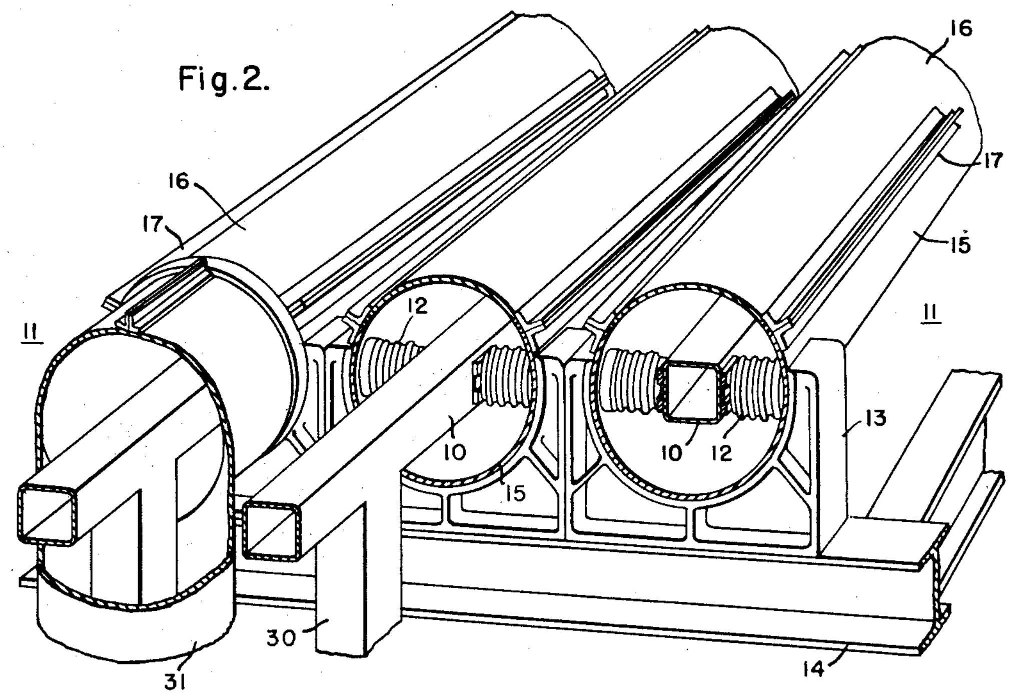
Fig. 2 is a view, in perspective, of a portion of the structure shown in Fig. 1.

Referring to the drawings, and particularly to Figs. 1 and 2, the three-phase bus structure shown therein is generally of the type disclosed in U. S. Patent No. 2,531,017, issued November 21, 1950, to C. P. West, H. H. Rugg and P. R. Pierson. Each phase of the three-phase structure comprises a bus conductor 10, a housing 11 for enclosing the conductor 10, oppositely disposed insulators 12 which are mounted in the housing 11 to support the conductor, and supporting members 13 which may be attached to a suitable supporting structure 14.

As shown most clearly in Fig. 2, the supporting members for all three phases may be attached to the common supporting structure 14. As described in the aforesaid Patent 2,531,017, the housing 11 comprises a trough 15 which is slightly greater than a semicircle in cross section, and a cover 16 which is removably attached to the trough 15 by clamp members 17 which may be drawn together by means of bolts 18, see Fig. 3.

Figure 3:
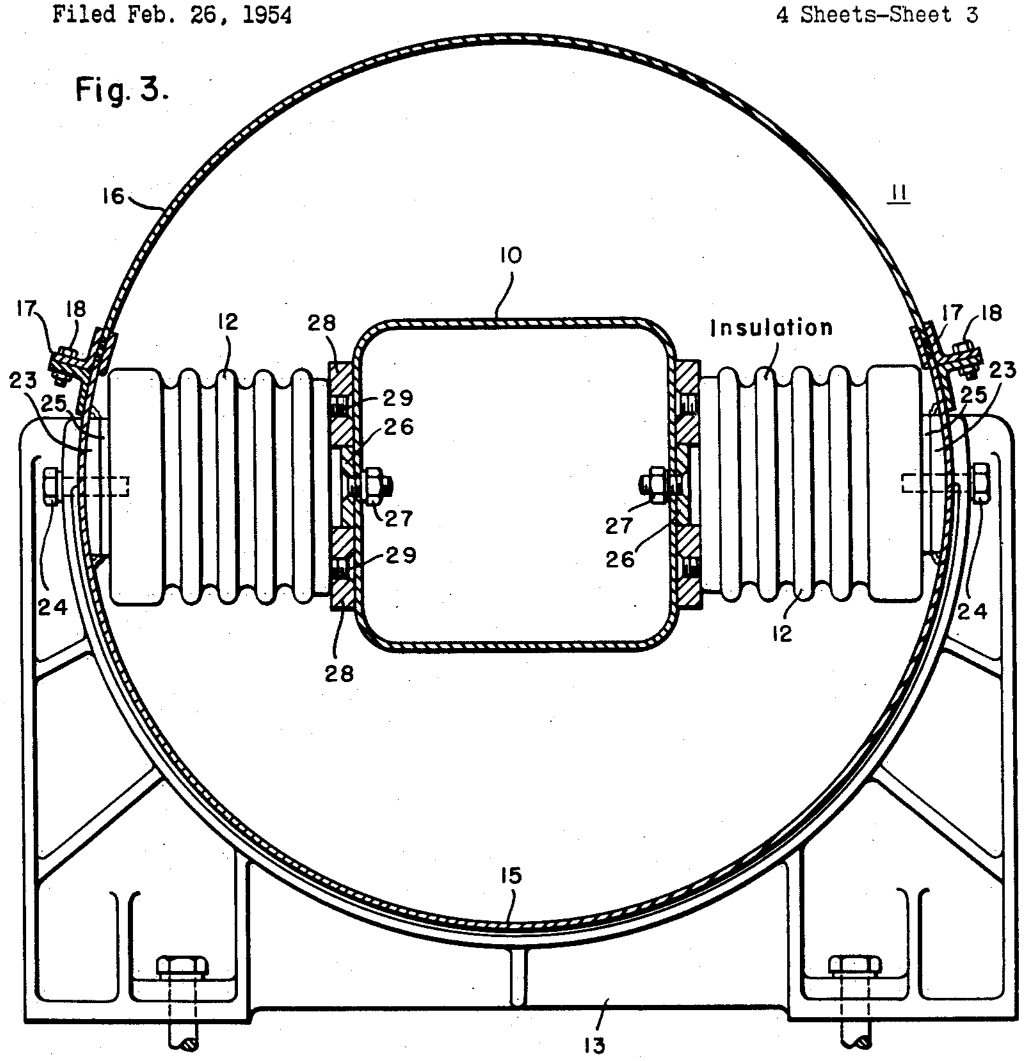
Fig. 3 is an enlarged view, partly in section and partly in elevation, of one phase of the bus structure.
Figure 4:
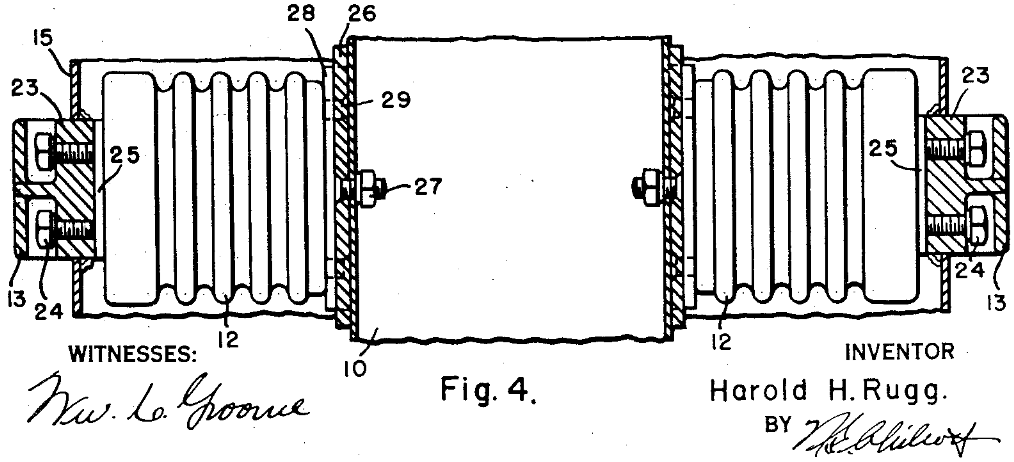
Fig. 4 is an enlarged view, partly in plan and partly in section, of the structure shown in Fig. 3.

As shown most clearly in Fig. 3 and as described in a copending application of C. P. West and H. H. Rugg, Serial No. 275,611, filed March 8, 1952, now Patent No. 2,763,710, issued September 18, 1956, each insulator 12 is rigidly attached to a boss 23 which is formed integrally with the supporting member 13 and projects through an opening in the trough 15. The insulator is attached to the boss by means of bolts 24 which are threaded into an insert 25 in the insulator 12. The trough 15 is welded to the boss 23 around the opening in the trough, thereby securing the trough to the supporting member 13. It will be understood that the supporting members 13 and insulators 12 may be provided at predetermined locations along the bus structure.

As shown, the bus 10 is a square tube composed of copper or other suitable conducting material. It will be understood that a round tube may be utilized if desired. It is preferable that the bus conductor 10 be so mounted between the diametrically opposed insulators 12 that no tension forces are applied to the insulators 12 when lateral forces are applied to the conductors 10 because of short circuit currents. It is also essential that the conductor 10 be permitted to expand and contract longitudinally because of temperature changes.

In the present structure, the bus 10 is supported by rectangular blocks 26 which are attached to opposite sides of the tube 10 by bolts 27. Each block 26 is slidably disposed between spaced rectangular blocks 28 which are attached to an insulator 12 by screws 29. Thus, the tube 10 is supported without imposing tension forces on the insulators 12, and the tube is free to expand and contract longitudinally.

In order to increase the current rating of the bus structure without increasing its size over previous structures of a lower rating, I have provided a system of forced ventilation for the conductors 10. As shown in Figs. 1 and 2, a T-connection 30 is provided for each phase conductor 10. A T-connection 31 is also provided for the housing 11 for each phase. The lower end of each T 30 is connected to a bushing 32 which is mounted in a partition 33 secured in the housing portion 31.

Figures 5, 6, 7:
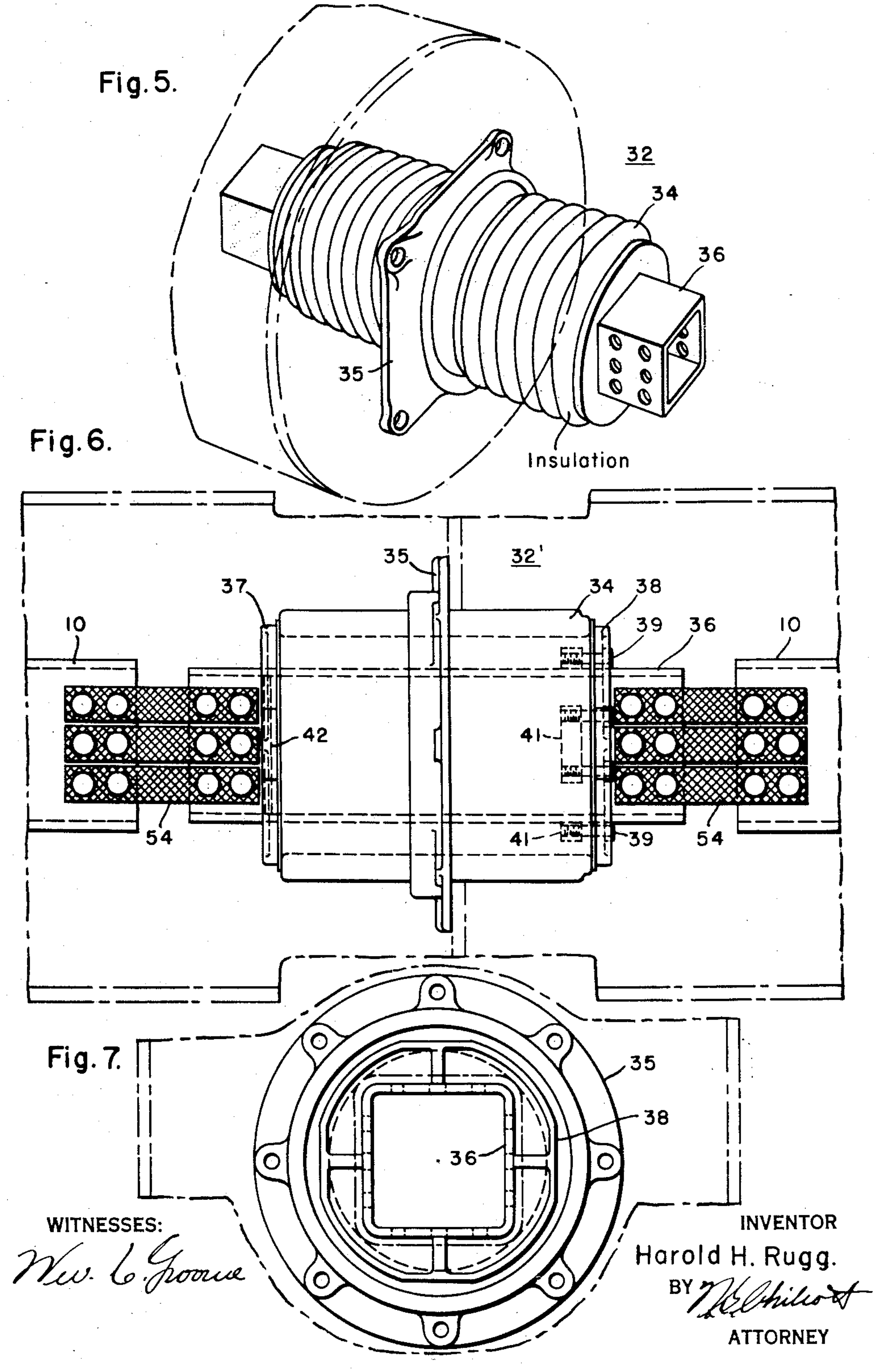
Fig. 5 is a view, in perspective, of a supporting bushing of one type utilized in the bus structure.
Fig. 6 is a view, in side elevation, of a bushing of another type utilized in the bus structure.
Fig. 7 is a view, in end elevation, of the bushing shown in Fig. 6.

The bushing 32 may be of the type shown in Figs. 5, 6 and 7 and comprises an insulating member 34, preferably composed of porcelain, which has a metal flange 35 secured thereto. A square tube 36, composed of copper or other conducting material, extends through the insulator 34. An end plate 37 is secured to the tube 36 and disposed at one end of the insulator 34. Another end plate 38 is removably attached to the other end of the bushing 34 by bolts 39 which are threaded into members 41 secured to the outside of the tube 36.

When it is desired to permit air to flow through the tube 36, the tube is left open. When it is desired to prevent air from flowing through the tube, as will be described more fully hereinafter, a baffle plate 42 may be provided inside the tube 36 near one end as shown in Fig. 6. As shown in Fig. 1, the bushings 32 may be mounted on the partitions 33 by means of the flanges 35.

As shown in Fig. 1, an upper compartment 43 of each housing portion 31 is connected to a heat exchanger 44 through a system of pipes 45. A screen 46 is provided at the outlet for each compartment 43 to deionize any gases that may be formed within the housing 11.

As also shown in Fig. 1, a lower compartment 47 for each housing portion 31 is connected to a fan or blower 48 through a system of pipes 49. A screen 51 is provided near the inlet for each compartment 47. The blower 48 may be driven by a motor 52.

Figure 8:
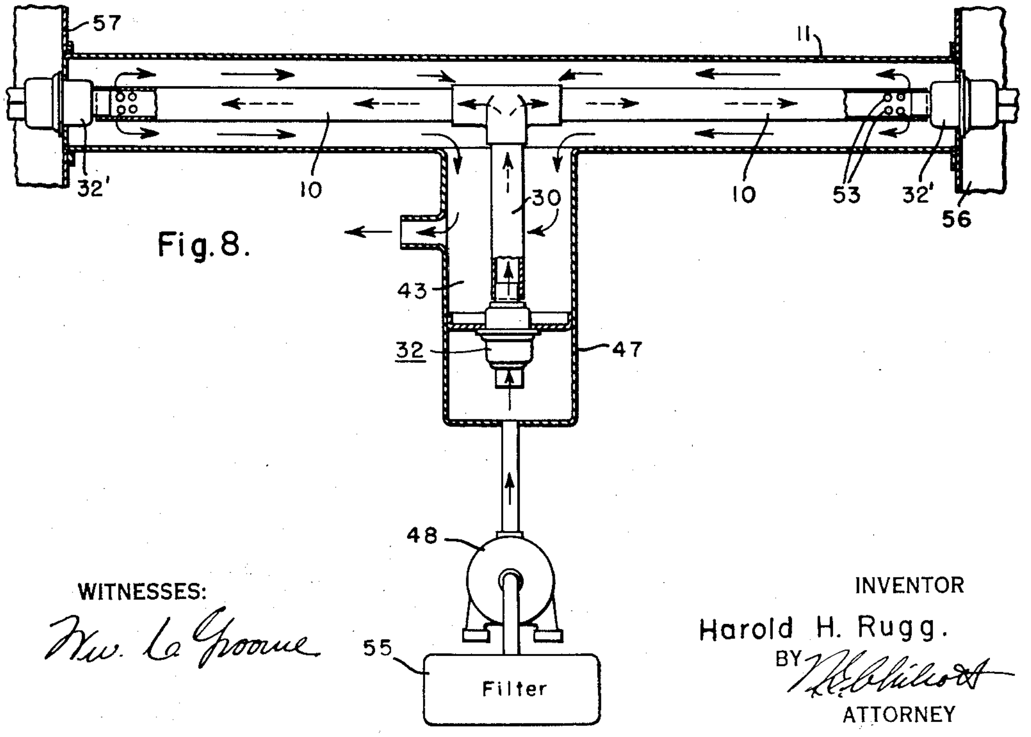
Fig. 8 is a diagrammatic view of a modified form of the invention.

As shown by the arrows in Figs. 1 and 8, air or other cooling fluid is forced into each compartment 47 and then through the bushing 32 into the bus conductor 10. The air flows outwardly through the bus conductor 10 for a predetermined distance to a point where the flow of air may be blocked by a bushing 32′ having a baffle plate therein as previously explained. The air is permitted to escape from the inside of the conductor 10, either through openings 53 provided in the conductor, or from the end of the conductor which may be connected to the bushing 32′ by flexible connectors 54, as shown in Fig. 6. The air returns through the space in the housing 11 surrounding the conductor 10. The air is drawn from the compartments 43 through the pipes 45 into the heat exchanger 44 where it is cooled and then recirculated by the blower 48.

Since the cool air which enters one end of the bus conductor 10 gradually becomes warmer as it flows outwardly through the conductor and as it returns around the outside of the conductor, it will be seen that a compensating effect is obtained because of the fact that the coolest air is on the inside where it enters the conductor and the hottest air is on the outside of the conductor where it leaves the compartment surrounding the end of the conductor. Thus, a substantially uniform temperature is maintained throughout the entire length of the conductor. Furthermore, the present system makes it possible to install all of the cooling equipment at one location since the air enters and leaves the bus structure at points located closely together.

As shown in Fig. 8, the T-connection 30 for the conductor 10 may be located at or near the midpoint of a length of the bus conductor. In this case, the air flows in opposite directions from the T-connection to the ends of the bus conductor and returns in the space inside of the housing 11 which surrounds the conductor. However, the same compensating effect is obtained since the cool air enters the inside of the conductor at the point where the hottest air surrounds the outside of the conductor. It is to be noted that the internal path of air flow is the same for each of the three phases, and that complete phase isolation is maintained between phases.

As also shown in Fig. 8, an open system of ventilation may be utilized in place of a closed system. The air is exhausted from the compartment 43 and fresh air is drawn into the system through a filter 55.

As shown in Fig. 8, the bus run may extend between a housing 56 which may be a generator housing, and a housing 57 which may be a transformer or switch-gear housing, or the bus run may extend between housings for any other electrical apparatus. As previously explained, the bushings 32′ contain baffle plates which prevent air from flowing through these bushings into the housings 56 and 57. However, electric current is permitted to flow through the conductors 36 provided inside the bushings 32′.

As shown in Fig. 6, a bus structure may be sectionalized by providing bushings 32′ at predetermined locations to prevent air from flowing from one section to the other. Thus, one section may be cooled independently of the adjacent section by providing a blower, or other means of developing fluid pressure, for each section. The flexible connectors 54 permit expansion and contraction of the conductors 10 in adjacent sections as well as permitting the air to escape from the inside of the conductors 10 into the surrounding housing.

From the foregoing description, it is apparent that I have provided a ventilating system for enclosed bus conductors which will maintain a substantially uniform temperature throughout the entire length of the conductors. While the system is particularly suitable for cooling bus structures of the isolated phase type which conduct large amounts of electric current, it is also suitable for bus structures of the segregated phase type in which the phase bus bars are separated by partitions in the housing. The present system will enable the current rating of a bus structure to be materially increased without increasing the size of the structure.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a bus structure, in combination, a hollow bus, a housing spaced from and enclosing the bus, insulating means disposed in the housing for supporting the bus, combined fluid-blocking and insulating means at each end of the housing, said blocking means being disposed inside the bus to prevent fluid from flowing past the blocking means, an opening in the bus ahead of each fluid-blocking means, fluid-circulating means connected to the bus intermediate its ends for causing a fluid to flow through the inside of the bus in opposite directions toward the ends of the bus and return toward the intermediate connection point through the space between the outside of the bus and the housing after passing through said openings, and heat exchanging means disposed in the path of the circulating fluid.

2. In a bus structure, in combination, a hollow bus, a housing spaced from and enclosing the bus, combined fluid-blocking and bus-supporting means at opposite ends of the housing, said blocking means being disposed inside the bus to prevent fluid from flowing past the blocking means, and fluid-circulating means connected to the bus intermediate its ends to cause a fluid to flow through the inside of the bus from said intermediate point of connection toward opposite ends of the bus and return toward said intermediate point through the space between the outside of the bus and the housing.

3. In a multi-phase bus structure, in combination, a plurality of hollow buses, a separate housing spaced from and enclosing each bus, insulating means disposed in each housing for supporting the bus, fluid-circulating means for causing a fluid to flow in each bus in one direction and return in the opposite direction through the space between each bus and its housing, said fluid being in direct contact with the bus during its travel in both directions along the bus, pipe means interconnecting said housings and said fluid-circulating means, and deionizing means associated with said pipe means.

4. In a three-phase bus structure, in combination, a plurality of hollow buses, a separate housing spaced from and enclosing each bus, insulating means disposed in each housing for supporting the bus, fluid-circulating means for causing a fluid to flow in each bus in one direction and return in the opposite direction through the space between each bus and its housing, said fluid being in direct contact with the bus during its travel in both directions along the bus, a heat exchanger connected in the path of the circulating fluid, pipe means interconnecting said housings and said heat exchanger and said fluid-circulating means, and deionizing means associated with said pipe means.

5. In a three-phase bus structure, in combination, at least one hollow conductor for each phase, housing means for segregating the phase conductors, insulating means for supporting the phase conductors, fluid-circulating means for causing a fluid to flow inside each conductor in one direction and return in the opposite direction on the outside of each conductor and inside the housing means, said fluid being in direct contact with the bus during its travel in both directions along the bus, pipe means interconnecting said housing means and said fluid-circulating means, and deionizing means associated with said pipe means.

References Cited in the file of this patent

UNITED STATES PATENTS

| | | |
|---|---|---|
| 1,706,810 | Paul | Mar. 26, 1929 |
| 1,866,611 | Affel | July 12, 1932 |
| 2,275,203 | Rudd | Mar. 3, 1942 |
| 2,306,527 | Daniels | Dec. 29, 1942 |
| 2,320,093 | Moore | May 25, 1943 |
| 2,535,187 | Anderson et al. | Dec. 26, 1950 |

FOREIGN PATENTS

| | | |
|---|---|---|
| 284,774 | Great Britain | Feb. 3, 1928 |
| 114,374 | Austria | Sept. 25, 1929 |
| 617,699 | Great Britain | Feb. 10, 1949 |